Figure 1:
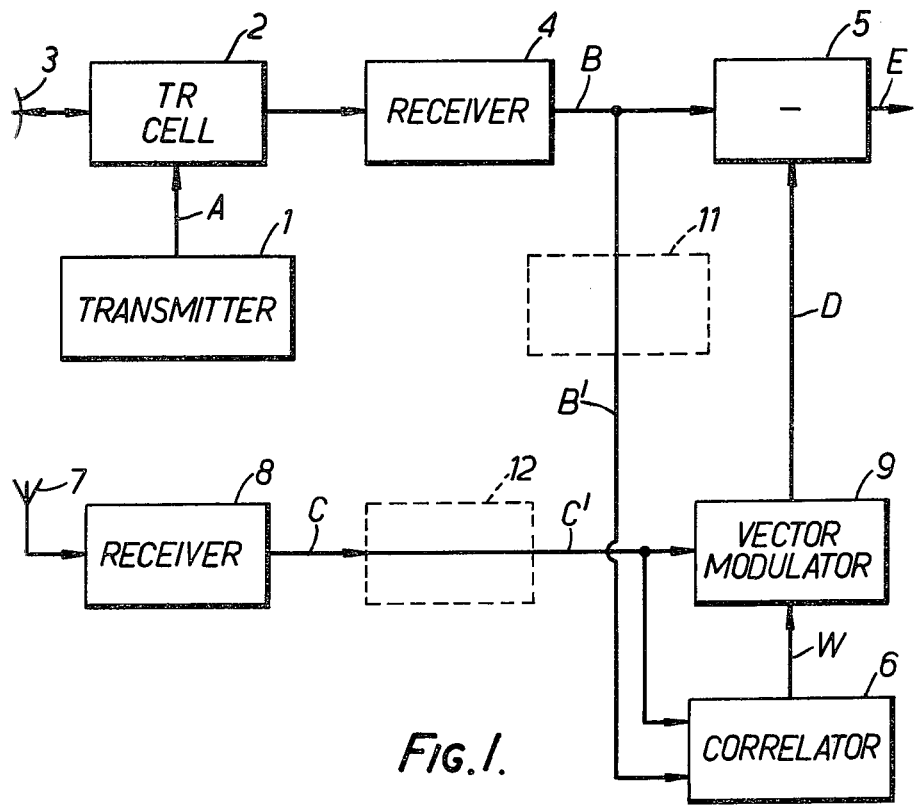

United States Patent [19]

Old

[11] 4,434,424
[45] Feb. 28, 1984

[54] SIDE LOBE CANCELLER FOR RADAR SYSTEMS

[75] Inventor: Julian C. Old, Chelmsford, England

[73] Assignee: The Marconi Company Limited, Chelmsford, England

[21] Appl. No.: 330,454

[22] Filed: Dec. 14, 1981

[30] Foreign Application Priority Data

Dec. 15, 1980 [GB] United Kingdom ............... 8039612

[51] Int. Cl.³ .......................... G01S 3/16; G01S 3/28
[52] U.S. Cl. .................................... 343/381; 343/7.7
[58] Field of Search ................. 343/100 CL, 100 LE, 343/7.7

[56] References Cited

U.S. PATENT DOCUMENTS

| | | | |
|---|---|---|---|
| 4,070,675 | 1/1978 | Daniel et al. | 343/7.7 |
| 4,086,592 | 4/1978 | Lewis et al. | 343/7.7 |
| 4,177,464 | 12/1979 | Masak | 343/100 LE |
| 4,204,211 | 5/1980 | Cavelos | 343/100 LE |

Primary Examiner—Theodore M. Blum

Attorney, Agent, or Firm—Spencer & Frank

[57] ABSTRACT

A radar receiver has a main channel 2,3 and 4, and an auxilliary channel 7,8 and 12. The main channel is fed from a directional antenna 3 and the auxilliary channel from a relatively non-directional antenna 7. A side lobe canceller consisting of components 5,6 and 9 receives signals from the main and auxilliary channels and produces a correction signal D which is applied to the main channel so as to cancel signals received via the side lobes of the antenna 3 and therefore attributable mainly to jamming signals.

In order that the signals B' fed from the main channel to the side lobe canceller should be free from clutter, as is necessary for the side lobe canceller to operate effectively, a moving target discriminator 11 is used so as to suppress any signal components due to stationary and slow moving objects, including any clutter features. In order to compensate for any frequency filtering and phase change effects of the circuit 11 a similar circuit 12 is inserted in the auxilliary channel.

2 Claims, 6 Drawing Figures

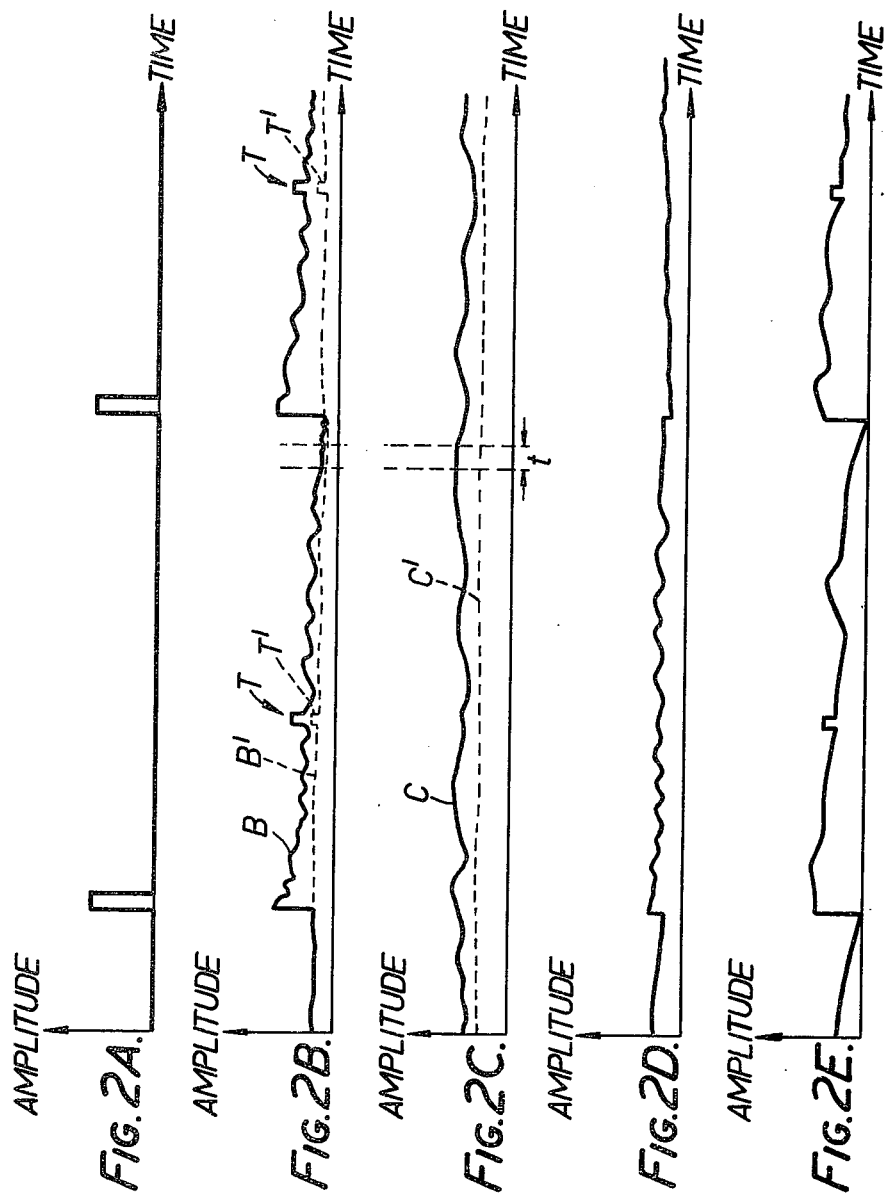

SIDE LOBE CANCELLER FOR RADAR SYSTEMS

This invention relates to an improved side lobe canceller for radar systems. A side lobe canceller receives a main signal from a directional antenna and auxilliary signals from one or more omnidirectional antenna. From these signals it derives a correction signal which is used to correct the main signal in such a way as to reduce the effects of jamming received by the side lobes of the directional antenna.

A radar system employing a known side lobe canceller is shown in FIG. 1. Signals appearing at the points A to E of FIG. 1 are shown by the continuous line illustrated respectively in FIGS. 2A to 2E.

A transmitter 1 produces pulses as shown in FIG. 2A at regular intervals. These are directed by a transmit/receive cell 2 to a rotating directional antenna 3. The pulse repetition frequency of the transmitted signals is such that there is little apparent rotation of the antenna 3 between adjacent pulses. Signals from the antenna 3 are directed by the transmit/receive cell 2 to a receiver 4 whose output is shown by the continuous line B of FIG. 2B. This signal B is the sum of components due to a target, if present, clutter and jamming and is normally maximum immediately after transmission of each pulse of FIG. 2A. The presence of a target is indicated on the waveform B at points T though, in practice, these points might be indistinguishable from the components of the signal derived from clutter and jamming. The significance of the broken line B' will be explained later. The signal B is applied to a subtractor 5 and to a correlator 6.

Signals received by an approximately omnidirectional antenna 7 are detected by a receiver 8, the output of which is shown by the continuous line on FIG. 2C. The significance of the broken line C' of FIG. 2 will be explained later. The signal C is not significantly effected by the presence of a target and is attributable mainly to jamming plus a component due to clutter.

The correlator 6 samples the signals B and C at time intervals t preferably shortly before each transmitted pulse when the signal B contains a relatively small component due to clutter and is therefore representative of jamming. From this sample it calculates a value W given by the equation $$W = \left( \sum_{i=1}^{N} M_i \times \overline{A}_i \right) / \left( \sum_{i=1}^{N} A_i \times \overline{A}_i \right)$$

where
$M_i$ is the ith sample of signal B.
$A_i$ is the ith sample of signal C; and
$\overline{A}_i$ is the complex conjugate of the ith sample of C.

All the quantities in the above equation are complex so that the calculation involves the sampling of both phase and quadrature outputs of the main and auxilliary channels and the processing of the real and imaginary parts.

The value W is applied to a vector modulator 9 the effect of which is to change the amplitude and phase of the signal C to produce a signal D which, when subtracted from the signal B in the subtractor 5 cancels that component of the signal B which is due to jamming. The result of this subtraction is a signal E from which any jamming component has been removed.

The components 5, 6, 8 and 9 shown in FIG. 1 are collectively known as an "open loop side lobe canceller." In an alternative system the lower input to the correlator 6 can be taken from point E at the output of circuit 5.

In such a rearranged configuration the components 5, 6, 8 and 9 are known as a "closed loop side lobe canceller."

A problem arises in a system such as described above when used with a high pulse repetition rate transmitter since there may be insufficient time, after transmission of a pulse and before transmission of the next pulse, for the signal B to decay to a state where the correlator 6 can take a sample which is substantially unaffected by clutter. The correlator 6 may thus misfunction with the results that the signal D is not perfectly adapted to cancel the jamming component of the signal B. The present invention arose with a view to mitigating or overcoming this problem.

The invention provides a radar receiver comprising a main channel arranged to process signals received by a directional antenna; and auxilliary channel arranged to process signals received by a relatively non-directional antenna; and a cancelling circuit connected to receive signals from both channels, to produce therefrom a correction signal and to apply the correction signal to the main channel, the correction channel being such as to cancel from the main channel components also present in the auxilliary channel; characterised in that the cancelling circuit is arranged to receive signals from the main channel via a moving target discriminator which serves to suppress signal components derived from fixed objects. The moving target discriminator can thus effectively suppress much of the clutter before being passed to the cancelling circuit. In this way the aforementioned problem can be completely or at least partially overcome by the use of the circuit 11.

The cancelling circuit 5, 6, 8 and 9 requires that its two inputs from the main and auxilliary channels be subjected to identical phase changes and/or frequency filtering. Therefore a second moving target discriminator should preferably be placed in the auxilliary channel, e.g. as shown at 12.

One particular way in which the invention can be carried out is shown in FIG. 1 by the blocks indicated in broken lines.

Referring to FIGS. 1 and 2 a moving target discriminating circuit 11 is effective to suppress those components of the main channel signal due to fixed and relatively slow moving clutter. The output B', as shown in broken lines in FIG. 2B, is therefore attributable mainly to jamming (and target if present as shown at T') and is only attributable to a small extent to clutter. The samples taken, during intervals t, by the cancelling circuit are therefore relatively clutter free even at high pulse repetition frequencies.

A circuit 12 identical to circuit 11 is positioned in the auxilliary channel to ensure that signals from both channels are subjected to identical filtering and phase changes. The output C' of the circuit 12 is illustrated in broken lines on FIG. 2C.

For simplicity of description only one auxilliary channel has been described above and shown in the drawings. However, in practice a number of such auxilliary channels could and probably would be used.

Whilst the invention is particularly applicable to radar apparatus which operates in the microwave region of the electromagnetic spectrum it is also applicable to other types of radar: for example acoustic or optical radar. Accordingly, the term "radar receiver" when used in this specification is defined as apparatus for deriving information about the presence or position of a feature in a medium surrounding the apparatus by sensing energy travelling through the medium from the aforesaid feature.

In the form of the invention shown in FIG. 1 the antenna 7 has been referred to as "omnidirectional" and has some response in all directions in a given plane, e.g. in azimuth. This is not however essential, it only being necessary that the auxilliary antenna be less directional than the main antenna. For example, in one form of the invention the antenna 7 could be arranged to rotate with the antenna 3 and be designed to have approximately equal gain in all directions other than directions in which the antenna 3 is facing; and to have approximately zero gain in those directions in which the antenna 3 is facing.

I claim:

1. A radar receiver comprising a main channel arranged to process signals received by a directional antenna; an auxilliary channel arranged to process signals received by a relatively non-directional antenna; and a cancelling circuit connected to receive signals from both channels, to produce therefrom a correction signal and to apply the correction signal to the main channel, the correction signal being such as to cancel from the main channel components also present in the auxilliary channel; characterised in that the cancelling circuit is arranged to receive signals from the main channel via a moving target discriminator.

2. A radar receiver according to claim 1 characterised in that the cancelling circuit is arranged to receive signals from the auxilliary channel via a second moving target discriminator.

* * * * *